Patented May 15, 1945

2,375,873

UNITED STATES PATENT OFFICE 2,375,873

STEROL AND STEROID ESTERS

Hans R. Rosenberg and Stockton G. Turnbull, Jr., Wilmington, Del., assignors to E. I. du Pont de Nemours & Company, Wilmington, Del., a corporation of Delaware No Drawing. Application August 17, 1943, Serial No. 498,985

4 Claims. (Cl. 260—397.2)

This invention relates to new sterol and steroid esters and processes for their production and use. More particularly it refers to esters of thiosterols and thiosteroids and processes for their manufacture and employment in the pharmaceutical and other industries.

Thiocholesterol has been heretofore described in the scientific literature by Wagner-Jauregg and Lennartz—Ber. 74, 27 (1941). According to this publication, it is produced by converting cholesterol bromide to cholesterol thiocyanate and reducing this latter compound by means of zinc amalgam to thiocholesterol. This process is subject to many disadvantages, among which may be mentioned the following: It is time-consuming and expensive; furthermore, it is very difficult to reproduce, and, in fact, able investigators have been unable to produce thiocholesterol in accordance with this process.

It is an object of this invention to produce thiocholesterol and related sterol and steroid derivatives by a new and inexpensive process. A further object is to produce these materials from a group of new thiosterol and thiosteroid esters which has been found to be of particular value for this purpose. A still further object is to produce sterol and steroid derivatives having a multiplicity of uses in the industrial arts and particularly in the pharmaceutical and related fields. Additional objects will become apparent from a consideration of the following description and claims.

These objects are attained in accordance with the herein described invention wherein thiocholesterol and related sterol and steroid derivatives are produced by simple hydrolysis. In a more restricted sense this invention is concerned with the production of thiosterols and thiosteroids by the hydrolysis of pseudo-thiourea derivatives of the desired sterols and steroids. In a still more restricted form this invention pertains to the hydrolysis of thiosterol and thiosteroid esters wherein the acyl radical is stable to oxidation. In its preferred embodiment this invention is concerned with the hydrolysis of cholesterol derivatives containing a thioester group wherein the acyl radical of the ester group is stable to oxidation; particularly it is concerned with the hydrolysis of cholesterol thioacetate and cholesterol thiobenzoate. Other modifications of the invention concern the new class of sterol and steroid esters previously referred to or suggested thereby, processes for their production and processes for the employment of the described products.

The invention may more readily be understood by a consideration of the following illustrative examples wherein the quantities are stated in parts by weight.

EXAMPLE 1

Cholesterol-S-pseudothiourea hydrohalides 583 parts by weight of cholesterol bromide and 119 parts of thiourea were dissolved by warming in 1500 parts of isopropanol. The solution was heated with agitation at reflux temperature over a period of 88 hours. The hydrobromide commenced to crystallize from solution after 16 hours as a white solid. Upon completion of the heating period the reaction mixture was cooled and the product was filtered off. It was purified by slurrying successively with warm ethyl ether and water which respectively removed unchanged cholesterol bromide and thiourea.

When pure, this new cholesterol derivative with the formula

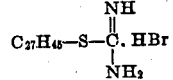

melted at 250–252° C. It is somewhat soluble in warm isopropanol, but insoluble for the most part in water and organic solvents such as ether, benzene, etc.

Calc. for $C_{28}H_{49}N_2SBr$: C, 64.00; H, 9.38; N, 5.34; S, 6.10. Found: C, 64.37; H, 9.05; N, 5.89; S, 5.63.

By condensation of cholesterol chloride with thiourea in isoamyl alcohol the cholesterol-S-pseudothiourea hydrochloride was obtained. It melted at 253–254° C.

EXAMPLE 2

Hydrolysis of cholesterol-S-pseudothiourea hydrobromide 23 parts of cholesterol-S-pseudothiourea hydrobromide in 500 parts of isopropanol was heated under nitrogen with a solution of 2.65 parts of potassium hydroxide in 250 parts of water at reflux for 24 hours. The oil that settled was extracted into ether. The aqueous layer was removed and the ether layer was repeatedly washed with water to free it of isopropanol. After drying over sodium sulfate and concentration there was obtained an oil. This crystallized from ethyl acetate and gave the thiocholesterol of melting point 99.5° C. described by Wagner-Jauregg, Ber. 74, 27 (1941).

Example 3

34 parts of cholesterol-S-pseudothiourea hydrobromide was heated while dissolved in 500 parts of a mixture of 25 parts piperidine and 475 parts alcohol. After two hours at reflux, the reaction mixture was poured into water and extracted into ether. After several washes with dilute hydrochloric acid, the ether layer was dried and concentrated to obtain 13 parts of purified thiocholesterol.

Example 4

27 parts of cholesterol-S-pseudothiourea hydrobromide was added to a warm solution of 18 parts of $Na_2S.9H_2O$ and 10 parts of piperidine in 1000 parts of alcohol and the mixture was heated under nitrogen at a gentle reflux for three hours. The mixture was then poured into water and extracted into ether which gave 17 parts of a pink oil that crystallized upon standing. When recrystallized from a mixture of ethyl acetate and alcohol, the thiocholesterol was obtained in relatively pure condition.

Example 5

Thiocholesterol acetate

To 108 parts of cholesterol-S-pseudothiourea hydrobromide there was added a solution of 7.2 parts of $Na_2S.9H_2O$ and 35 parts of piperidine in 3000 parts of alcohol. The mixture was held at a gentle reflux under nitrogen for 16 hours and was then poured into water. The product was extracted into ether and freed of alcohol and piperidine by repeated washes with dilute hydrochloric acid. Concentration of the dried ethereal solution gave an oil which solidified. This was triturated with ethyl acetate, whereupon the thiocholesterol dissolved and there remained on filtration impure dicholesteryl disulfide,

$$C_{27}H_{45}S\text{—}SC_{27}H_{45},$$

which melted at 144–146° C. when pure.

The impure thiocholesterol obtained as an oil by concentration of the above ethyl acetate solution was heated at 140° C. with 200 parts of acetic anhydride for 16 hours. The acetic anhydride was removed by heating under vacuum, and the thiocholesterol acetate that remained was purified by recrystallization from ethyl methyl ketone. It melts at 102–104° C. and is soluble in benzene, ethyl acetate, chloroform and ether, while only slightly soluble in cold methanol, ethanol and acetone.

Calc. for $C_{29}H_{48}OS$: C, 78.35; H, 10.86; S, 7.2. Found: C, 78.58; H, 10.71; S, 7.13.

Example 6

Thiocholesterol benzoate 3.0 parts of thiocholesterol was dissolved by warming in 40 parts of pyridine. The solution was cooled and treated with 5 parts of benzoyl chloride. After standing for two days, the mixture was poured into ice water and the crystalline benzoate was filtered and washed with cold methanol. Upon recrystallization from ethyl acetate the thiocholesterol benzoate was obtained. It sinters slightly at 125° C., melts at 150° C. to a cloudy liquid and becomes clear at 161° C.

Calc. for $C_{34}H_{50}OS$: C, 80.63; H, 9.88; S, 6.32. Found: C, 80.04; H, 9.65; S, 6.75.

Example 7

Hydrolysis of thiocholesterol acetate

To 100 parts of alcohol there was added 1 part of piperidine and 1.8 parts of $Na_2S.9H_2O$. The mixture was heated to reflux under nitrogen to dissolve the sodium sulfide and was then cooled and 2.7 parts of thiocholesterol acetate was added. After heating at reflux under nitrogen for 1.5 hours, the solution was filtered while warm from the 0.57 part of dicholesteryl disulfide that had formed. The alcoholic filtrate was dissolved in ether and the mixture was washed several times with water. Upon drying over sodium sulfate and concentration, there was obtained 0.06 part of dicholesteryl disulfide and 1 part of thiocholesterol which was purified by recrystallization from ethanol.

It is to be understood that the foregoing examples are representative merely of a few of the many embodiments of this invention. They may be varied widely with respect to the reactants, the amounts thereof and the conditions of reaction without departing from the scope hereof.

In place of the hydrolyzable compounds referred to, it is to be understood that other hydrolyzable compounds may be employed. In fact, any thiosterol and/or thiosteroid derivative which may be hydrolyzed to the parent thiosterol or thiosteroid may be utilized, in accordance with the present invention.

Any of the well known and commonly used hydrolyzing techniques may be employed. As a general rule, however, it is preferred to use alkali metal or alkaline earth hydroxides in carrying out this hydrolysis. As previously mentioned, such materials are not essential and may be dispensed with in favor of one of the other hydrolyzing procedures. For instance, in place of alkali metal or alkaline earth hydroxides or other alkalies, organic amines may be employed. Example 3 refers to the use of piperidine. For this purpose, and in place thereof, other strongly dissociating organic amines or quaternary ammonium hydroxides may be used. The use of reducing agents in conducting this hydrolysis is advantageous in that it reduces or eliminates entirely the production of undesirable by-products. In Examples 4 and 7 sodium sulfide was used for this purpose. Its presence reduced materially the formation of the undesired dicholesteryl disulfide which may be obtained by simultaneous oxidation of the thiocholesterol as it is formed in the hydrolysis. It is, of course, understood that in place of sodium sulfide, other reducing agents which are stable under the conditions of reaction may be employed, as for example, sodium hydrosulfite.

In place of the thiourea-acetate, or -benzoate derivatives of the parent compound it is of course understood that any other hydrolyzable derivative thereof may be employed. Esters wherein the acyl radical is stable to oxidation are particularly satisfactory for this purpose. A few of such esters are, for instance, aliphatic carboxylic acids generally, such as the propionate, butyrate, palmitate, laurate, stearate, etc.

In place of chlorestrol derivatives it is to be understood that other sterol and/or steroid derivatives may be employed. A representative group of sterols which may be used for this purpose are ergosterol, stigmasterol, sitosterol, campesterol, sterols obtained from mussels and other invertebrate animals, ostreasterol, etc. An illustrative group of steroids which may be used for this purpose comprises the following: cholic acid, androsterone, testosterone, steriod digitonides, estrone, estriol, equilenin, and the like.

It is also contemplated that the sterol and steroid derivatives may contain more than one hydrolizable constituent. This constituent or these constituents may be present on any position in the molecule depending upon the particular derivative which it is desired to produce.

By means of the present invention a simple and inexpensive process for producing important thiosterols and thiosteroids has been devised. Likewise, an entirely new class of valuable sterols and steriods has been obtained. These materials are of considerable value in the industrial arts and particularly in the pharmaceutical and related fields. They may be used to produce a number of vitamins, hormones, etc. For example, it is contemplated that instead of using cholesterol for the production of 7-dehydrocholesterol in accordance with the instructions of U. S. Patent No. 2,098,984, thiocholesterol may be used therein to produce the corresponding 7-dehydrothiocholesterol, and that this latter product may be substituted for or used in admixture with 7-dehydrocholesterol in the production of new and important vitamins. In the same manner it is contemplated that the corresponding thiosterol and thiosteriod derivatives may be used in place of or in admixture with sterols and steroids in the various processes and for the various purposes wherein such compounds have heretofore been used or are capable of use.

As many widely different embodiments of this invention may be made without departing from the spirit and scope thereof, it is to be understood that the invention is not limited to the specific embodiments thereof except as defined in the appended claims.

We claim:
1. A process for producing thiocholesterol which comprises hydrolyzing a cholesterol-S-pseudo-thiourea hydrohalide.
2. A process for producing thiocholesterol which comprises hydrolyzing thiocholesterol acetate.
3. A process for producing thiocholesterol which comprises hydrolyzing thiocholesterol benzoate.
4. A process for producing thiocholesterol which comprises hydrolyzing a thiocholesterol having an acid group substituted on the 3-position.

HANS R. ROSENBERG.
STOCKTON G. TURNBULL, JR.